United States Patent
Okamura et al.

(10) Patent No.: US 6,191,935 B1
(45) Date of Patent: Feb. 20, 2001

(54) ELECTRIC DOUBLE-LAYER CAPACITOR HAVING HARD GRANULAR CARBON MATERIAL PENETRATING INTO THE ALUMINUM COLLECTOR ELECTRODES

(75) Inventors: Michio Okamura, Kanagawa; Minoru Noguchi, Saitama; Manabu Iwaida, Saitama; Eisuke Komazawa, Saitama; Akinori Mogami, Tokyo, all of (JP)

(73) Assignees: Honda Giken Kogyo Kabushiki Kaisha; Jeol Ltd., both of Tokyo (JP)

( * ) Notice: Under 35 U.S.C. 154(b), the term of this patent shall be extended for 0 days.

(21) Appl. No.: 09/173,860

(22) Filed: Oct. 16, 1998

(30) Foreign Application Priority Data

Oct. 20, 1997 (JP) .................................................. 9-286878

(51) Int. Cl.[7] ..................................................... H01G 9/00
(52) U.S. Cl. ......................................... 361/502; 29/25.03
(58) Field of Search ................................... 361/502, 508, 361/509, 516, 528, 529, 532; 29/25.03

(56) References Cited

U.S. PATENT DOCUMENTS

| | | | |
|---|---|---|---|
| 5,621,607 | * | 4/1997 | Farahmandi et al. ................ 361/502 |
| 5,682,288 | * | 10/1997 | Wani ..................................... 361/502 |
| 5,875,092 | * | 2/1999 | Jow et al. ............................. 361/502 |

\* cited by examiner

*Primary Examiner*—Anthony Dinkins
(74) *Attorney, Agent, or Firm*—Webb Ziesenheim Logdson Orkin & Hanson, P.C.

(57) ABSTRACT

An electric double-layer capacitor that is adapted for use in an electric vehicle, for example, and uses aluminum collector electrodes. A native oxide film is formed on each aluminum electrode. Hard granular carbon is made to penetrate through the oxide film into each aluminum electrode. The aluminum electrodes are connected with positive and negative polarizing electrodes, respectively, via the granular carbon, thus lowering the contact resistance.

6 Claims, 3 Drawing Sheets

ELECTRIC DOUBLE-LAYER CAPACITOR HAVING HARD GRANULAR CARBON MATERIAL PENETRATING INTO THE ALUMINUM COLLECTOR ELECTRODES

FIELD OF THE INVENTION

The present invention relates to an electric double-layer capacitor and, more particularly, to an electric double-layer capacitor which is characterized by a decreased internal resistance and an increased power density by reducing the contact resistance between each polarizing electrode and a corresponding aluminum collector electrode, the polarizing electrode consisting mainly of activated carbon.

DESCRIPTION OF THE PRIOR ART

The prior art electric double-layer capacitor can store a considerably smaller amount of energy than the lead-acid battery that is a typical secondary battery. However, the electric double-layer capacitor exhibits an electrostatic capacity density larger than that of an aluminum electrolytic capacitor of similar withstand voltage by several orders of magnitude. Furthermore, the electric double-layer capacitor stores electric energy as chemically uncombined electrons and so the capacitor can, in essence, store and release electric energy efficiently and quickly.

In view of these advantages, techniques for connecting such electric double-layer capacitors in parallel with a battery in applications where quick charging and discharging are required such as in electric vehicles have been investigated. Furthermore, electric double-layer capacitors having lower internal resistances and used in various power applications have been investigated.

FIG. 8 depicts the structure of a conventional electric double-layer capacitor, illustrating the internal resistance. The inside of the capacitor is partitioned into parts by a separator 5. Electrodes 3 of activated carbon are placed in an organic electrolyte 4 in these parts. Each electrode 3 is connected with an electrical lead 6 via a contact portion 2 and an aluminum collector electrode 1. Where the energy density of the electric double-layer capacitor is high and the internal resistance is relatively high (on the order of $10^2$ Ω per electrostatic capacity F), the electrodes of activated carbon have a relatively large thickness of several millimeters. The impregnated electrolyte contributes mostly to the internal resistance. The electrodes of activated carbon contribute secondly. The effects of the aluminum collector electrodes and the contact resistance are very small.

However, in an electric double-layer capacitor having one order of magnitude less internal resistance, the thickness of the electrodes of activated carbon is roughly halved. Concomitantly, the contributions of the electrolyte and the electrodes of activated carbon are decreased accordingly.

In a type having one order of magnitude further less internal resistance, the electrodes of activated carbon are thinner. Therefore, the contributions of the electrolyte and the electrodes of activated carbon are still smaller. Consequently, the electrical leads and the aluminum collector electrode (especially, the contact resistance shown in FIG. 5) affect the characteristics of the whole capacitor materially.

Aluminum is a metal having a low electrical resistance. Furthermore, aluminum has the advantage that it deteriorates the withstand voltage of the assembled capacitor only a little. Collector electrodes of aluminum have unparalleled excellence. However, great problems take place where collector electrodes of aluminum are used. An oxide film is immediately formed on the surface. Even if this film is very thin, its withstand voltage is so high that a low voltage handled in electric double-layer capacitors cannot break the film. This film is inserted between the aluminum collector electrode and an electrode of activated carbon, producing contact resistance.

This oxide film of aluminum gives better withstand voltage to aluminum than nickel and titanium that are much more inactive. Therefore, the insulation provided by the presence of the oxide film and increase of the contact resistance are two conflicting factors.

Consequently, where various kinds of plating are formed on the aluminum film, the surface is processed to impart electrical conductivity to the surface, or adhesive bonding is done, if the contact resistance is successfully reduced, then the withstand voltage deteriorates. Conversely, if attention is paid to the withstand voltage, the contact resistance does not decrease.

SUMMARY OF THE INVENTION

The present invention is intended to solve the foregoing problem.

It is an object of the present invention to provide an electric double-layer capacitor which uses aluminum collector electrodes and has a reduced internal resistance, thus achieving higher power density.

The present invention lies in an electric double-layer capacitor comprising positive and negative polarizing electrodes separated by a separator and aluminum collector electrodes for extracting electric charge from the polarizing electrodes that consist mainly of activated carbon and produce electric double layers. The aluminum collector electrodes are connected with external terminals, and each has an oxide film on its surface. Hard granular carbon penetrates through the oxide film into the aluminum electrode. The aluminum electrodes are in contact with their respective polarizing electrodes via the granular carbon.

Other objects and features of the invention will appear in the course of the description thereof, which follows.

A complete understanding of the invention will be obtained from the following description when taken in connection with the accompanying drawing figures wherein like reference characters identify like parts throughout.

DETAILED DESCRIPTION OF THE INVENTION

An aluminum foil was fabricated using rolling techniques without anodization process or any other special processing step. After the rolling, a thin oxide film having a thickness of several micrometers was formed on the surface with the lapse of time. While this native oxide film existed on the surface of the aluminum foil, the contact resistance was compared with those of other metals.

Figure 1:
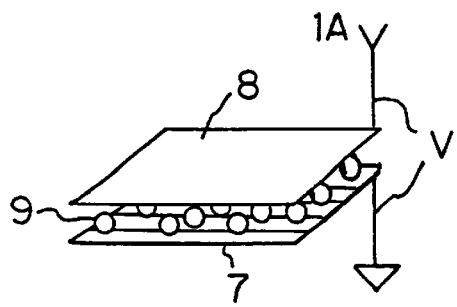
FIG. 1 is a schematic view illustrating a method of measuring contact resistance.

Referring to FIG. 1, two collector electrodes 7 and 8 consisted of metal foil, and each measured 40 mm×40 mm. These two electrodes 7 and 8 were stacked on top of each other. A uniform pressure was applied from above this laminate. In one sample of the laminate, a quite thin layer of active carbon powder 9 was formed between the collector electrodes 7 and 8 such that these two electrodes 7 and 8 were not in direct contact with each other. In another sample of the laminate, no active carbon layer was formed between the electrodes. The contact resistances of these two samples were measured. The results are given in Table 1.

TABLE 1

| Material | Contact Resistance ($\Omega \cdot cm^2$) | |
|---|---|---|
| | with activated carbon | w/out activated carbon |
| Al | 24.5 | 1.22 |
| Ni | 3.70 | $20.2 \times 10^{-3}$ |
| Cu | 2.70 | $4.6 \times 10^{-3}$ |

As can be seen from Table 1 above, where there is no activated carbon, the contact resistance of the collector electrodes is dominant and so great variations of the contact resistance can be measured. Samples of the laminate made of Al (aluminum), Ni (nickel) and Cu (copper), respectively, were prepared. The contact resistance of the sample using Al foil was greater than those of the samples using Ni and Cu foils, respectively, by approximately one to three orders of magnitude. Where activated carbon is present, the resistance of the activated carbon itself is always inserted in series and, therefore, the surface resistance of the collector electrodes exhibits smaller variations than where no activated carbon is present. However, the contact resistance is still greater than those of the samples using Ni and Cu foils, respectively, by approximately one order of magnitude.

In this way, the contact resistance of the sample using aluminum collector electrodes is much greater than those of the samples using collector electrodes of other metals. Accordingly, in the present invention, hard amorphous granular carbon is made to penetrate into the surfaces of the aluminum collector electrodes. This will be described in further detail below.

Figure 2A:
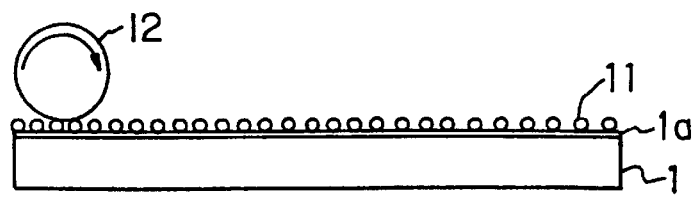
FIG. 2(a) is a side elevation of an aluminum collector electrode on which granular carbon is sprinkled in accordance with the present invention.
Figure 2B:
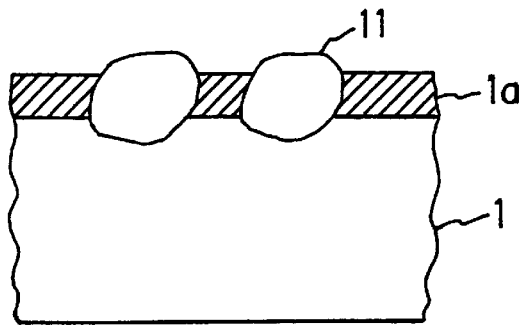
FIG. 2(b) is a fragmentary enlarged cross section of the aluminum collector electrode shown in FIG. 2(a)
Figure 2C:
FIG. 2(c) is a side elevation similar to FIG. 2(a), but in which the collector electrode has been completed.

FIGS. 2(a)–2(c) show a collector electrode for use in an electric double-layer capacitor in accordance with the present invention. The collector electrode, indicated by numeral 1, is made of aluminum, for example. An oxide film 1a is formed on the surface of the foil. Granular carbon 11 is sprayed and pressed against the surface using a roller 12, for example. A plate (not shown) may be placed on the surface of the collector electrode 1, and the roller 12 may be pressed against the surface of the collector electrode via the plate. The granular carbon may be pressed against the surface of the collector electrode by any other method. As a result, the hard granular carbon 11 penetrates through the oxide film 1a into the surface of the aluminum foil, as shown in the fragmentary enlarged view of FIG. 2(b). The state of the finished collector electrode 1 is shown in FIG. 2(c).

Figure 3:
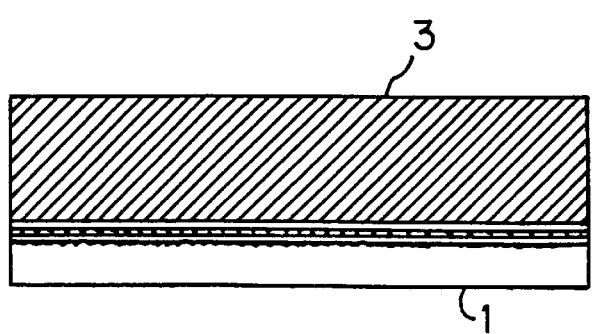
FIG. 3 is a side elevation of an aluminum collector electrode with which an electrode of activated carbon is in contact, the collector electrode being built in accordance with the present invention.

As shown in FIG. 3, if the aluminum collector electrode 1 shown in FIG. 2(c) is brought into contact with a polarizing electrode 3 consisting mainly of activated carbon, the oxide film produces no electrical effect, because the granular carbon penetrates through the oxide film. Hence, the contact resistance can be lowered sufficiently. Furthermore, long-term stability is obtained by the anchoring effect. In addition, the surface of the aluminum collector is not attacked by the electrolyte, since the surface is covered with the oxide film and granular carbon and thus is not exposed. Consequently, good voltage resistance characteristics are derived.

Figure 8:
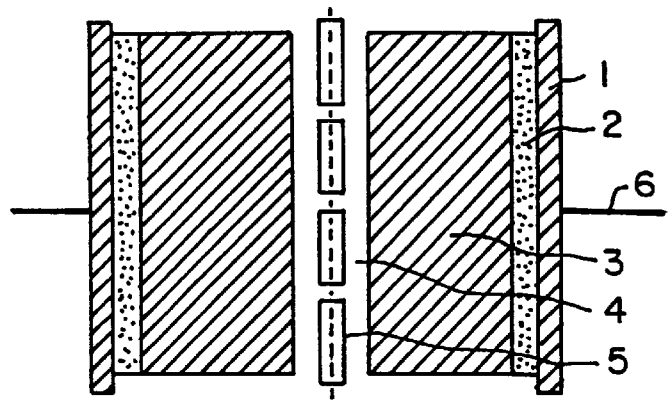
FIG. 8 is a schematic cross section of the prior art electric double-layer capacitor.

The aluminum collector electrode surface-treated as described above is used in the electric double-layer capacitor shown in FIG. 8. This greatly reduces the contact resistance between the aluminum collector electrode and the polarizing electrode. The internal resistance is decreased.

Figure 4:
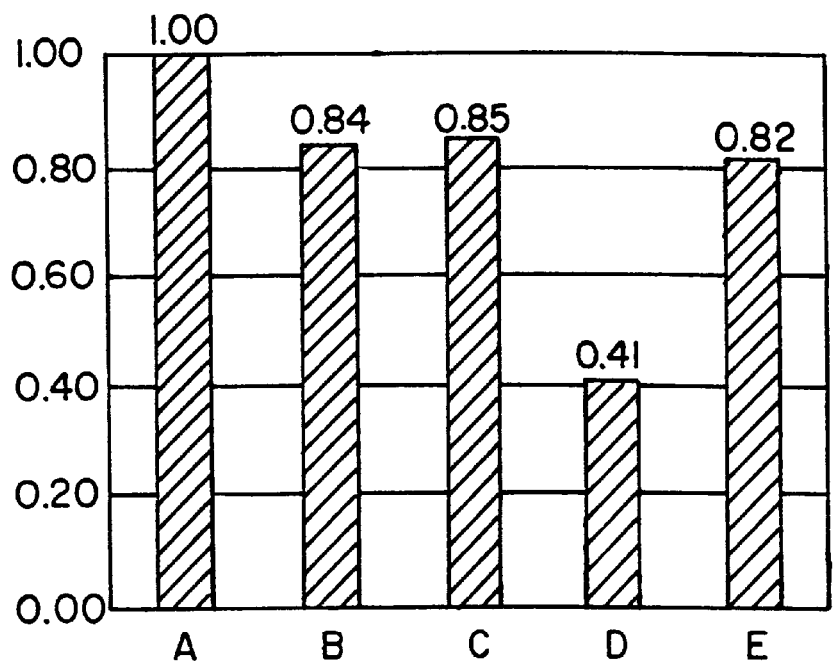
FIG. 4 is a graph illustrating the effects of a surface-treated aluminum collector electrode.

The effects of the surface-treatment of the aluminum collector electrode are described by referring to FIG. 4. Five samples A–E were prepared. Each sample contained a polarizing electrode of the construction shown in FIG. 1, the electrode measuring 40 mm×40 mm×0.3 mm. The resistance value across the terminals was measured. The sample A was an electrode not treated at all. The resistance value obtained from the sample A was taken to be a reference value and normalized to 1.00. The sample B was an aluminum collector electrode into which acetylene black was rubbed. The sample C was an aluminum collector electrode into which fine powder of graphite was rubbed. The sample D was an aluminum collector electrode into which AVGCFs (vapor-grown carbon fibers) were rubbed. The sample E was a polarizing electrode consisting mainly of activated carbon, and vapor-grown carbon fibers were kneaded into the electrode.

It can be seen that the contact resistance is lowered by surface-treating the aluminum collector electrode in accordance with the present invention. Since vapor-grown carbon fibers take the form of fine fibers, exhibit very high crystallinity and are very hard, they produce anchoring effects. The electrical conductivity is high and the resistance is low. The contact resistance is reduced greatly. Preferably, the material that is made to penetrate into the surface of the aluminum collector electrode is carbon that should be similar to the material of the polarizing electrodes of the capacitor in order to prevent the withstand voltage from varying. In sample E, the contact resistance can be decreased by pressing granular carbon into the polarizing electrodes.

An example of making uniform the resistance distribution by homogenizing the distribution of hard granular carbon is given now. Vapor-grown carbon fibers (VGCFs) were used as the hard granular carbon. Small amounts of binder, solvent and water were mixed in the following weight ratio:

VGCGs:cellulose (water soluble):ethanol:water= 5:1:100:50

Then, this mixture was applied to the surface of the aluminum collector foil at a density of about 0.4 to 9.0 g/cm$^2$. Subsequently, the mixture was dried and rolled with a roller. Thereafter, polarizing electrodes were attached to the aluminum collector foil. The rolling effects and the effects of the vapor-grown carbon fibers on the resistance value were examined under the following conditions.

Figure 5:
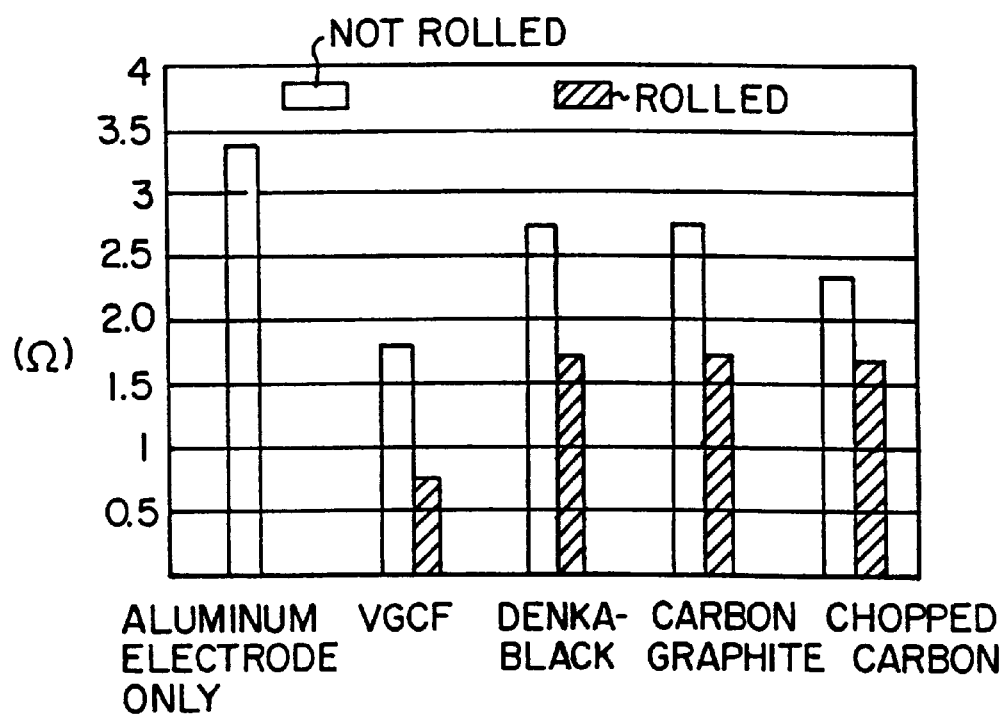
FIG. 5 is a graph illustrating the effect of rolling.
Figure 6:
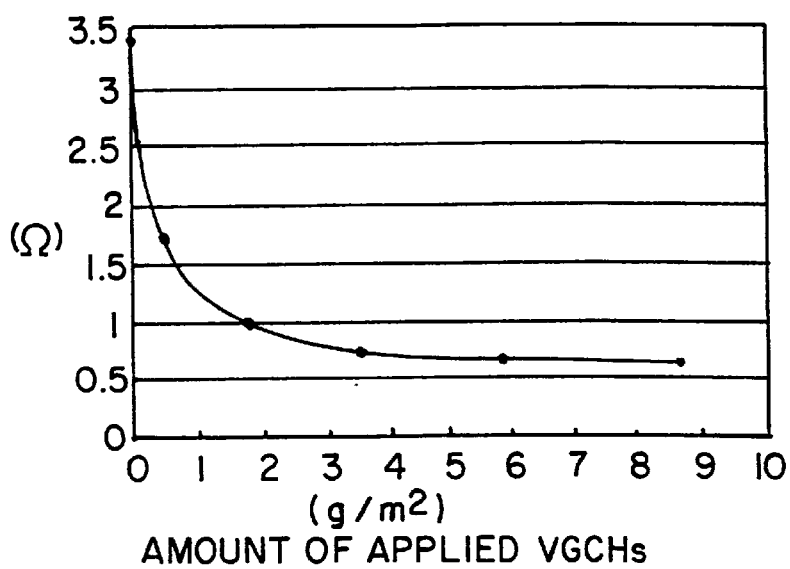
FIG. 6 is a graph illustrating the relation between the amount of VGCFs (vapor-grown carbon fibers) applied and the resistance value.

Furthermore, acetyleneblack (Denka Denkablack), graphite, and chopped carbon (Kureha Kureha-tow) were examined under the same conditions with the same weight ratio of binder, solvent and water. The results were compared.
Test Conditions:
   electrode size: 38 mm×39.5 mm×0.34 mm (thickness)
   electrolyte: 2M MEPHYBF4PC
   charging and discharging current: 25 mA
   amount of applied filler: about 3.5 g/m$^2$
Rolling Conditions:
   roller diameter: 200 mm
   roller length: 500 mm
   roller load: about 600 N The resistance of the conductive filler (granular carbon) was measured when it was rolled and not rolled, respectively. As can be seen from the graph of FIG. 5, the rolling decreased the resistance value of every kind of conductive filler. The effect is especially great in the case of vapor-grown carbon fibers (VGCFs).
Test Conditions:
   electrode size: 38 mm×39.5 mm×0.34 mm (thickness)
   electrolyte: 2M MEPHYBF4PC
   charging and discharging current: 25 mA
Rolling Conditions:
   roller diameter: 200 mm
   roller length: 500 mm
   roller load: about 600 N FIG. 6 is a graph showing the relation of the resistance value to the amount of applied vapor-grown carbon fibers (VGCFs). It is observed that as the amount of the applied fibers is increased, the resistance value decreases. The resistance value is kept substantially constant above 3.5 g/m$^2$. It is desired, therefore, that the vapor-grown carbon fibers be applied at a density of 3.5 g/m$^2$ or more and then rolled.

Figure 7:
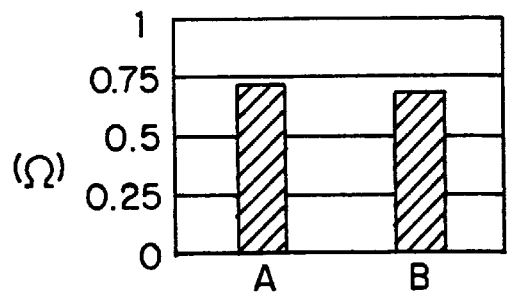
FIG. 7 is a graph illustrating the effects of reapplication of VGCFs.

Vapor-grown carbon fibers were applied at a density of 3.5 g/m$^2$ and rolled. No vapor-grown carbon fibers were again applied to some of the rolled samples. The resulting resistance value is indicated at A in FIG. 7. Vapor-grown carbon fibers were again applied at a density of 3.5 g/m$^2$ to the other samples. The resulting contact resistance is indicated at B in FIG. 7. As can be seen from the graph of FIG. 7, reapplication decreases the resistance value.

As can be understood from the description provided thus far, the present invention greatly reduces the contact resistance between an aluminum collector electrode and an electrode of activated carbon. An anchoring effect offers long-term stability. Consequently, an electric double-layer capacitor having a decreased internal resistance and producing higher power density can be accomplished.

Having thus described my invention with the detail and particularity required by the Patent Laws, what is desired protected by Letters Patent is set forth in the following claims.

What is claimed is:

1. An electric double-layer capacitor comprising:

a positive polarizing electrode and a negative polarizing electrode placed in an electrolyte and separated from each other by a separator, each of said polarizing electrodes consisting mainly of activated carbon producing an electric double layer;

aluminum collector electrodes in contact with said polarizing electrodes, respectively, and acting to transfer electric charge to or from said polarizing electrodes, said aluminum collector electrodes being connected with external terminals;

oxide films formed upon surfaces of said aluminum collector electrodes, respectively; and hard granular carbon penetrating through said oxide films into said aluminum collector electrodes.

2. The electric double-layer capacitor of claim 1, wherein said hard granular carbon is made to penetrate into the aluminum collector electrodes by applying a binder and a solvent to the hard granular carbon to form a mixture, applying said mixture upon the surfaces of said aluminum collector electrodes, drying said mixture, and rolling said mixture.

3. The electric double-layer capacitor of claim 2, wherein prior to bringing said collector electrodes into contact with said polarizing electrodes, again applying said mixture to said aluminum collector electrodes.

4. The electric double-layer capacitor of claim 1, wherein said hard granular carbon is made to penetrate into said aluminum collector electrodes by pressing said aluminum collector electrodes against said hard granular carbon held upon the surfaces of said polarizing electrodes.

5. The electric double-layer capacitor of any one of claims 1 to 4, wherein said hard granular carbon are acetylene black, fine powder of graphite, or vapor-grown carbon fibers.

6. The electric double-layer capacitor of any one of claims 1 to 4, wherein the said hard granular carbon is crystalline carbon.

\* \* \* \* \*